US011811940B2

(12) United States Patent
Jeffrey et al.

(10) Patent No.: US 11,811,940 B2
(45) Date of Patent: *Nov. 7, 2023

(54) FALSE POSITIVE REDUCTION IN ELECTRONIC TOKEN FORGERY DETECTION

(71) Applicant: Microsoft Technology Licensing, LLC, Redmond, WA (US)

(72) Inventors: Bryan R. Jeffrey, Littleton, MA (US); Craig Gordon Lockwood, North Bend, WA (US); Reeves Hoppe Briggs, Boxborough, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,391

(22) Filed: Aug. 10, 2022

(65) Prior Publication Data
US 2022/0385473 A1 Dec. 1, 2022

Related U.S. Application Data

(63) Continuation of application No. 16/674,699, filed on Nov. 5, 2019, now Pat. No. 11,451,396.

(51) Int. Cl.
*H04L 29/06* (2006.01)
*H04L 9/32* (2006.01)
*H04L 9/00* (2022.01)

(52) U.S. Cl.
CPC ............ *H04L 9/3234* (2013.01); *H04L 9/002* (2013.01); *H04L 9/3247* (2013.01)

(58) Field of Classification Search
CPC ..... H04L 9/3234; H04L 9/002; H04L 9/3247; H04L 63/0807; H04L 63/1483; H04L 63/126; H04L 63/0815; H04L 63/105
See application file for complete search history.

(56) References Cited

U.S. PATENT DOCUMENTS 7,024,552 B1 * 4/2006 Caswell .............. H04L 63/0492
380/258
8,762,731 B2 * 6/2014 Engler .................. H04L 9/3247
713/176

(Continued)

FOREIGN PATENT DOCUMENTS

| CN | 110401629 A | * 11/2019 | ......... H04L 63/0428 |
| CN | 111767533 A | * 10/2020 | ............. G06F 21/31 |
| WO | WO-2012123394 A1 | * 9/2012 | ........... G06F 21/335 |

*Primary Examiner* — John B King
(74) *Attorney, Agent, or Firm* — Schwegman Lundberg & Woessner, P.A.

(57) ABSTRACT

The disclosed embodiments generate a plurality of anomaly detector configurations and compare results generated by these anomaly detectors to a reference result set. The reference result set is generated by a trained model. A correlation between each result generated by the anomaly detectors and the result set is compared to select an anomaly detector configuration that provides results most similar to those of the trained model. In some embodiments, data defining the selected configuration is then communicated to a product installation. The product installation instantiates the defined anomaly detector and analyzes local events using the instantiated detector. In some other embodiments, the defined anomaly detector is instantiated by the same system that selects the anomaly detector, and thus in these embodiments, the anomaly detector configuration is not transmitted from one system to another.

20 Claims, 8 Drawing Sheets

(56) References Cited

U.S. PATENT DOCUMENTS

| | | | | |
|---|---|---|---|---|
| 9,021,586 | B2* | 4/2015 | Garskof | H04L 63/1425 |
| | | | | 709/224 |
| 9,104,838 | B2* | 8/2015 | Gajda | H04L 63/10 |
| 9,667,635 | B2* | 5/2017 | Byers | H04L 63/1408 |
| 9,774,622 | B2* | 9/2017 | Krapf | H04L 63/123 |
| 2008/0098464 | A1* | 4/2008 | Mizrah | G06F 21/36 |
| | | | | 726/5 |
| 2010/0205448 | A1* | 8/2010 | Tarhan | H04L 63/0807 |
| | | | | 713/185 |
| 2011/0131627 | A1* | 6/2011 | Abendroth | H04L 63/0815 |
| | | | | 726/1 |
| 2011/0161289 | A1* | 6/2011 | Pei | G06F 16/275 |
| | | | | 707/613 |
| 2015/0302390 | A1* | 10/2015 | Huxham | G06Q 20/382 |
| | | | | 705/67 |
| 2017/0070534 | A1* | 3/2017 | Bailey | G06F 21/602 |
| 2018/0152845 | A1* | 5/2018 | Unnerstall | G06Q 20/3224 |
| 2018/0300717 | A1* | 10/2018 | Haque | H04L 9/3213 |
| 2018/0375849 | A1* | 12/2018 | Koskimies | H04L 9/3234 |
| 2019/0068588 | A1* | 2/2019 | Inabe | H04L 63/108 |
| 2019/0068602 | A1* | 2/2019 | Burckhardt | H04L 63/126 |
| 2019/0103968 | A1* | 4/2019 | Srinivasan | H04L 9/0894 |
| 2020/0382957 | A1* | 12/2020 | Johnson | H04W 12/041 |
| 2021/0021601 | A1* | 1/2021 | Valecha | H04L 9/0872 |

* cited by examiner

FALSE POSITIVE REDUCTION IN ELECTRONIC TOKEN FORGERY DETECTION

CROSS-REFERENCE TO RELATED APPLICATION

This application is a continuation of U.S. application Ser. No. 16/674,699, filed Nov. 5, 2019, which application is incorporated herein by reference in its entirety.

BACKGROUND

Security tokens are a common mechanism for providing secure access to resources in modern computer systems. To ensure validity, security tokens are typically signed by an issuer of the security token. The issuer maintains a private key that is used to digitally sign the security token. Validation of the security token can include verifying the digital signature of the security token via a public key of the issuer. If the security token has been altered, or was not signed by the issuer, the validation of the digital signature will fail.

Nefarious actors attempt to generate fraudulent security tokens to obtain unauthorized access to computer resources protected by security tokens; These fraudulent tokens must include a digital signature that appears to be generated by a valid token issuer. This can easily be achieved if the private key of the token issuer becomes compromised. Once the private key is known, these nefarious actors may fraudulently issue tokens that grant access to resources controlled by the token issuer. In some cases, access to the private key is obtained via other fraudulent techniques, such as obtaining access to system administrative accounts, or other back door mechanisms of obtaining unauthorized access to the private key data. Thus, methods for ensuring token issuing processes are not compromised, or detecting when they are compromised, are needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
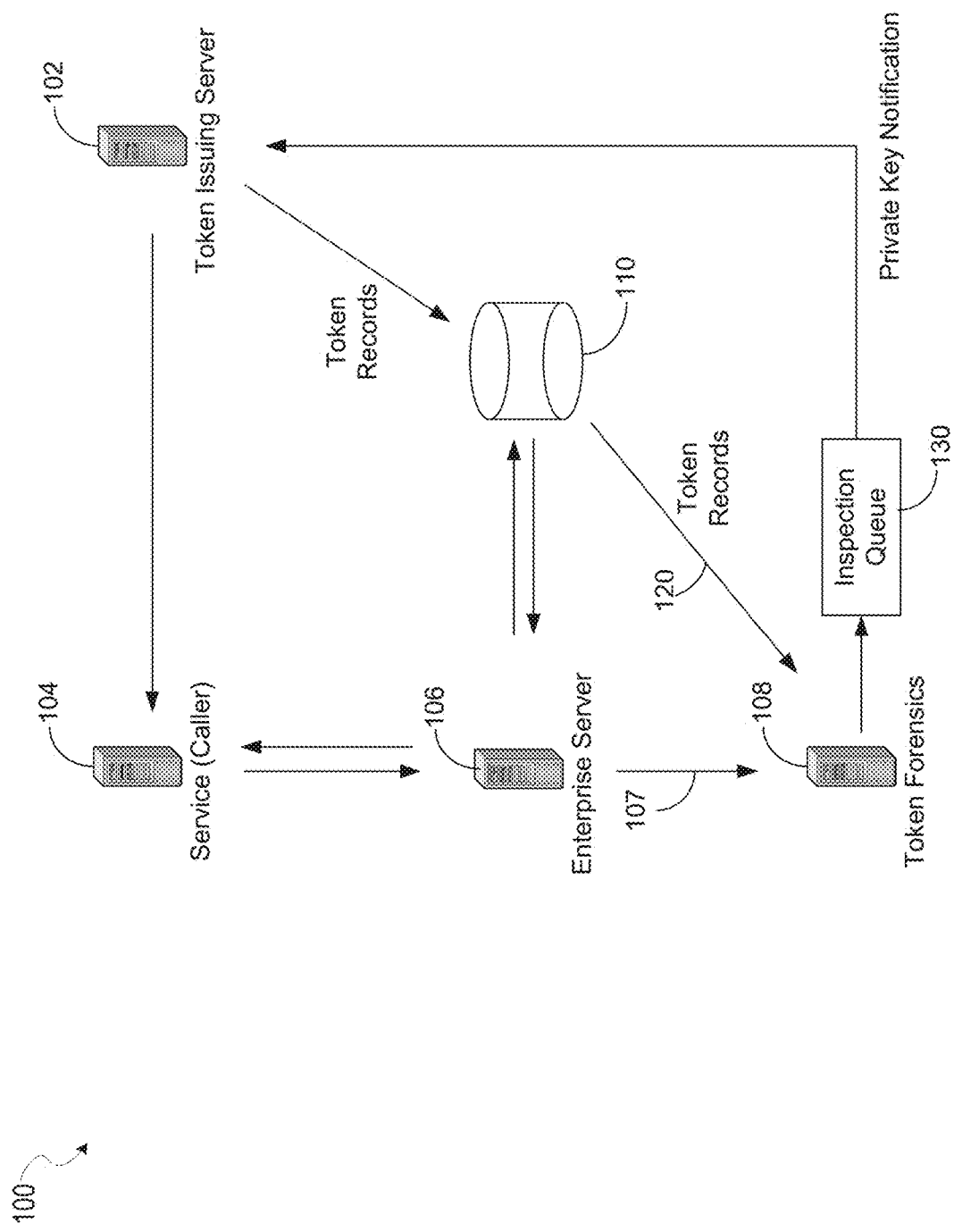
FIG. 1 is an overview diagram of a system that implements one or more of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The disclosed embodiments provide for detection of fraudulent electronic security tokens. As described above, in some cases, a private key of a token issuing authority becomes compromised, and thus available to nefarious actors. These actors can then issue tokens that provide access to computer resources and appear valid, in that they include valid digital signatures.

Detection of fraudulent security tokens can be performed both before access is provided based on the token, or after the token has been used to access computer resources. Evaluating tokens before their use works to decrease the unauthorized access of computer resources, but likely imposes some latency when accessing those resources. Evaluating tokens after their use avoids adding additional latency to access operations while allowing some authorized access before the fraudulent token is detected.

In some of the disclosed embodiments, security tokens used to access computer resources are evaluated after the access has occurred. Thus, these embodiments function as security forensics, identifying compromised tokens after their use but mitigating against additional future use of those tokens or, for example, tokens generated using an equivalent private key that may have been compromised. Other embodiments operate before access via a token occurs. These embodiments evaluate the token for indications of fraudulent activity, and disallow or invalid tokens that fail to meet certain validity criterion.

Some embodiments track sequence numbers issued by a token issuing authority. For example, each token issued by a particular token issuing authority includes a unique sequence number. The unique sequence number ensures that multiple tokens from a token issuing authority are not duplicates of each other, and helps to prevent replay type attacks. These disclosed embodiments track the sequence numbers and are then able to predict sequence numbers issued by a particular token issuing authority going forward. In the event that the token issuing authority is not available to confirm the validity of a particular token, instead of rejecting the token, at least some of the disclosed embodiment compare the token's sequence number with a range of sequence numbers predicted by tracking of sequence numbers from this particular authority. A token issuing authority is defined by, in some aspects, a private key used by the token issuing authority to digitally sign tokens. Use of different private keys may represent different token issuing authorities in some aspects.

Some embodiments also determine validity of a token based, at least in part, on a service or client attempting to access resources using the token. For example, some of the disclosed embodiments maintain reputation data for "users" of electronic tokens, and make determinations on whether a token is likely valid based on the "users" (e.g. service or client).

Some of the disclosed embodiments utilize one or more of the techniques discussed above to reduce the incidence of false positives with regards to detection of fraudulent tokens. For example, some implementations may initially flag a token as invalid based on factors such as whether the token issuing authority is online and is able to validate the token. These implementations may determine the token is invalid if unable to validate the token with the token issuing authority. However, this approach results in a fair number of valid tokens categorized as invalid. To reduce the number of false positives, additional validations may be performed when these initial indications would otherwise indicate an invalid token. For example, as discussed above, if the token cannot be validated via the original token issuing authority, some of these implementations consider the client or service attempting to access computer resources using the token. If the client/service has a relatively good reputation, the token may not be flagged as invalid even if the token issuing authority is not available to validate the token. Similarly, if the token issuing authority is not available, false positives are reduced by determining whether the token's sequence number is within a confidence interval of possible sequence numbers for the issuing time of the token and a history of token sequence numbers from the token issuing authority as further discussed above. If the sequence number falls within the confidence interval, the token is classified as valid (in at least some embodiments), even if other methods of token validation may not be available. This reduction in false positives can result in improved operational efficiencies. For example, some network operators may devote resources to manual investigations of tokens flagged as invalid. To the extent these resources are allocated to investigating valid tokens falsely classified as invalid, costs associated with validating tokens increases, and fewer resources can be devoted to investigating tokens that are actually forged or otherwise invalid. Thus, the disclosed embodiments not only improve operational efficiency, but also improve computer security, by increasing the resources available to pursue security vulnerabilities, such as invalid tokens resulting from a compromised private key of a token issuing authority.

FIG. 1 is an overview diagram of a system that implements one or more of the disclosed embodiments. The system 100 includes a token issuing server 102, service 104, enterprise server 106, and a token forensics server 108. The system 100 also includes a token datastore 110. The token issuing server 102 issues tokens and stores information relating to the issued tokens in the token datastore 110. In some embodiments, there is a 1:1 mapping between token issuing servers, generally, and token issuing authorities. In some other aspects, multiple token issuing servers may issue tokens for a single token issuing authority (e.g. to achieve a desired throughput, multiple servers may be necessary). In some embodiments, the token issuing server 102, in some embodiments, issues tokens for a single token issuing authority. In some aspects, each token issuing authority has particular network connection information that provides connectivity to the token issuing authority. For example, a single token issue authority may accept token requests via a particular combination of hostname/Internet Protocol (IP) address and/or destination port number, for example.

The token issuing server provides tokens, on request in some embodiments, to the service 104. The service 104 requests particular functions from the enterprise server 106. For example, the service 104 requests, in some embodiments, access to files, or the performance of certain computing operations or functions from the enterprise server 106. To accomplish functions requested by the service 104, the enterprise server 106 requires a valid electronic security token be provided, such as a valid token provided by the token issuing server 102. The enterprise server 106 validates a token provided by the service 104 by, in part, consulting with the original token issuing server 102 or the token datastore 110. For example, in some embodiments, the token is digitally signed using a private key of the token issuing server. The enterprise server 106 identifies a public key of the token issuing server 102 in some embodiments, via the token datastore 110. After validating the token, the enterprise server 106 performs the service requested by the service 104. As mentioned, the validation of the token by the enterprise 106 includes confirmation that the token's digital signature is valid for the token issuing server 102. However, if the token issuing server's private key is compromised, a fraudulent actor may issue tokens and obtain nefarious access to the computer resources provided by the enterprise server 106.

As shown in FIG. 1 some of the disclosed embodiments provide log records 120 indicating use of tokens to a tokens forensics system 108. The token forensics system 108 performs one or more validity checks to confirm that a token used to access computer resources of the enterprise server 106 is valid. Furthermore, the token forensics system 108 implements these validity checks to reduce a probability of false positives being generated. For example, in some environments, the token data store 110 and/or the token issuing server 102 are inaccessible. This inaccessibility may result from a general network outage between the token forensics system 108 and the token datastore 110 and/or the token issuing server 102. Alternatively, or more of the token datastore 110 and/or the token issuing server 102 may be unresponsive, due to an internal problem. Thus, the token forensics server 108 is unable to perform some validation functions when one or more of the token data store 110 and/or token issuing server 102 are unavailable. In some prior implementations, the token forensics server 108 would consider this situation to indicate that the token itself is invalid, and would provide the token to an inspection queue 130.

In cases where the validation fails due to the token data store 110 and/or the token issuing server 102 being unavailable to the token forensics system 110, the inspection queue becomes populated by one or more tokens that are in fact valid, but were falsely flagged as invalid due to the inaccessibility. As described further below, some of the disclosed embodiments reduce the inclusion of valid tokens in the inspection queue 130 by performing additional checks when one or more of the token datastore 110 and/or token issuing server 102 are unavailable. This reduces the number of valid tokens included in the inspection queue 130. In embodiments that rely on manual inspection of tokens in the inspection queue, the reduction in false positives provided by the disclosed embodiments can provide substantial cost and personnel savings when compared to prior methods.

Figure 2:
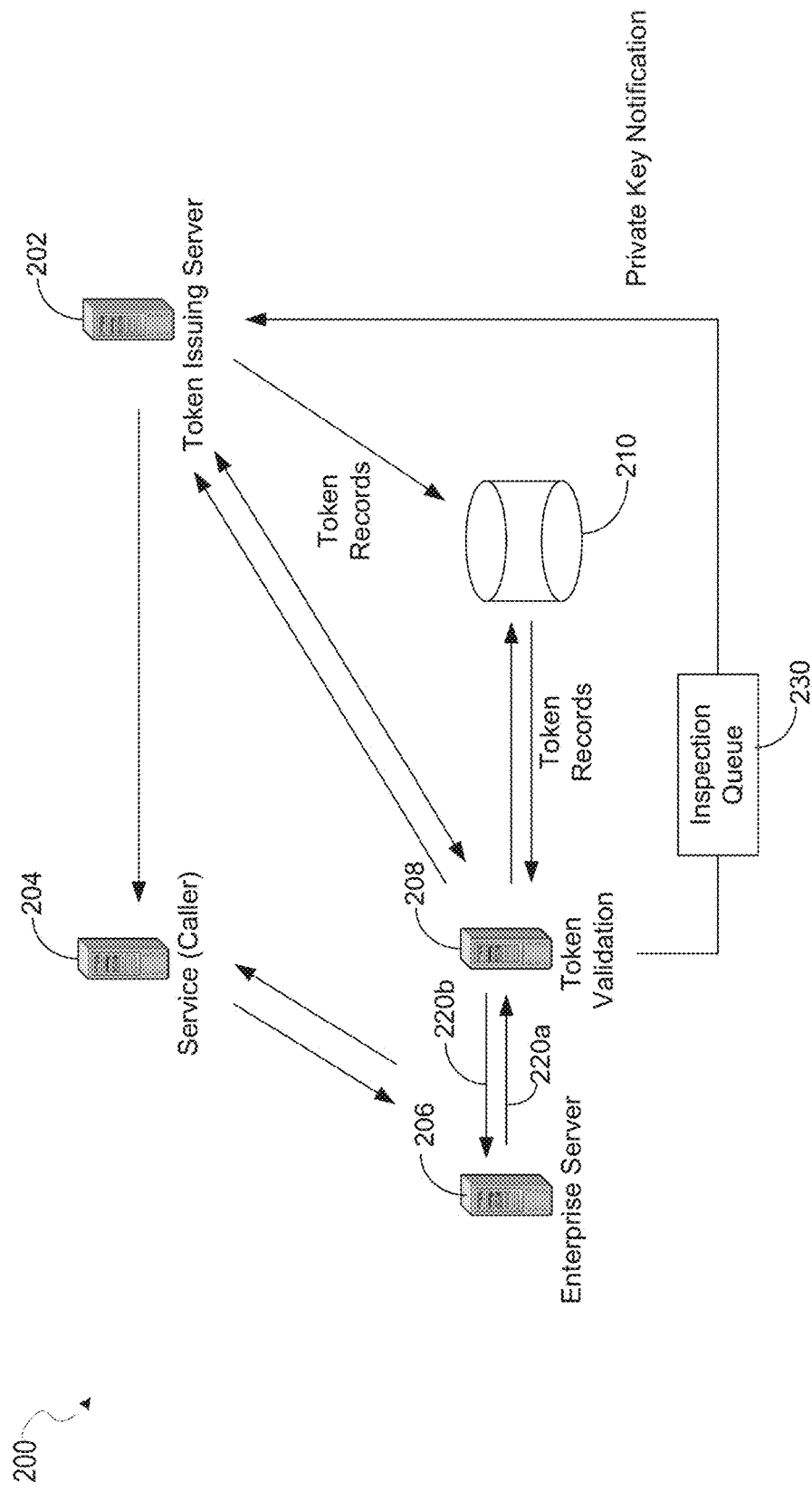
FIG. 2 is an overview diagram of a system that implements one or more of the disclosed embodiments.

FIG. 2 is an overview diagram of a system that implements one or more of the disclosed embodiments. The system 200 includes a token issuing server 202, service 204, enterprise server 206, and token validation server 208. The system 200 differs from the system 100 of FIG. 1 in that with system 200, the validation performed by the token validation server 208 occurs before computer resources are made accessible via the token. Thus, upon receiving a request to access computer resources from the service 204, the enterprise server 106 provides the token to the token validation server 208 via a message 220a. The token validation server 208 then performs one or more verifications to determine whether the token is likely valid. The validations performed by the token validation server 208 rely on one or more of the token issuing server 202 and/or token datastore 210. The token validation server 208 provides a result of its validation back to the enterprise server 106 via a message 220b. Thus, the implementation of the system 200 of FIG. 2 differs from that of system 100 of FIG. 1 in that the implementation of FIG. 1 evaluates token validity after the token has been used to access computer resources. The system 100 provides for improved response time in access to those computer resources by reducing the amount of validation performed on a token before access is granted. The token forensics are then performed offline, without any latency requirements imposed by the need to access computer resources efficiently and quickly. The embodiment illustrated by system 200 and FIG. 2, in some embodiments, results in increased latency in access to computer resources by performing additional token validation (e.g. via the token validation server 208), before access to computer resources is granted based on the token. The system 200 benefits from this additional token validation via a reduction in access to computer resources provided based on an invalid token.

Figure 3:
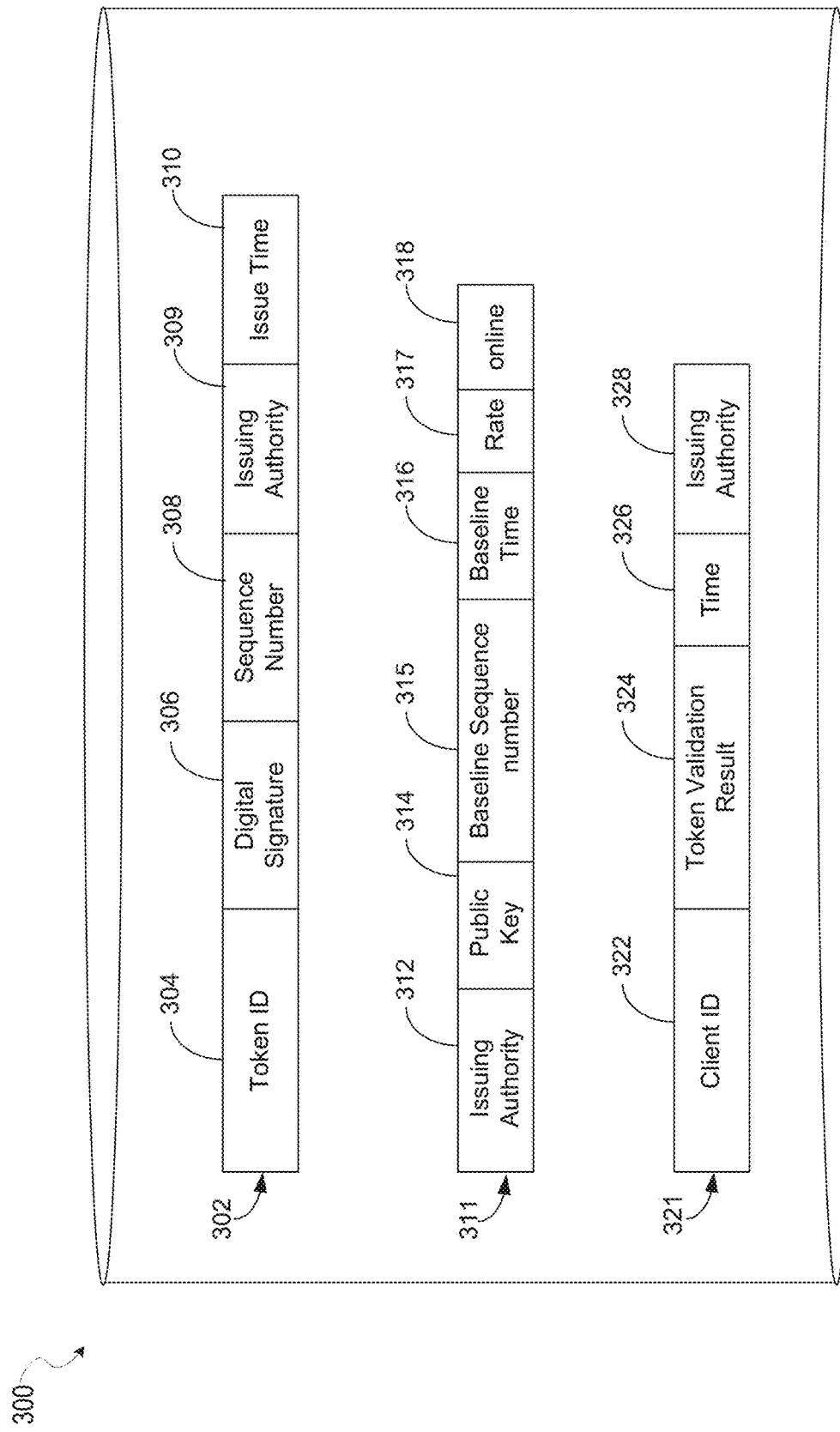
FIG. 3 shows data structures that may be implemented in one or more of the disclosed embodiments.

FIG. 3 shows data structures that may be implemented in one or more of the disclosed embodiments. While the discussion of the data structures illustrated in FIG. 3 refers to the data structures as relational database tables, one of skill would understand that a variety of data structure types are implemented in various embodiments. For example, various embodiments may utilize non-relational data stores, traditional in-memory data structures such as linked lists, trees, arrays, or other structures.

FIG. 3 shows a token table 302, issuing authority table 311, and a client tracking table 321. The token table 302 stores records defining fields of a token. The token table 302 includes a token identifier field 304, digital signature 306, sequence number 308, issuing authority identifier 309, and issue time 310. The token identifier field 304 uniquely identifies a token. The digital signature 306 stores a digital signature of the token. In some embodiments, the digital signature 306 is generated by a token issuing authority using a private key of the token issuing authority. In these embodiments, the digital signature is decoded via a public key of the token issuing authority as explained further below. The sequence number field 308 stores a sequence number of the token. The sequence number is assigned to a token by a token issuing authority. While the sequence number field 308 is described as a "number," in some embodiments, the sequence number may not be a number per se, but may include at least both alpha and numeric characters. The issuing authority field 309 identifies an issuing authority of the token. For example, some embodiments may include multiple token issuing servers, such as the token issuing servers 102 and/or 202 discussed above with respect to FIGS. 1 and 2 respectively. The issue time field 310 stores an issue time for the particular token.

The issuing authority table 311 includes an issuing authority identifier 312, public key field 314, baseline sequence number field 315, baseline time field 316, rate field 317, and an online indicator field 318. The issuing authority identifier field 312 uniquely identifies a token issuing authority. Thus, in embodiments implementing multiple token issuing authorities (e.g. token issuing server 102 and/or 202), the issuing authority identifier field 312 uniquely identifies a particular one of the token issuing authorities. The token issuing authority field 312 is cross referenceable with the token issuing authority field 309 of the token table 302. The public key field 314 stores a public key for the token issuing authority identified via the issuing authority identifier field 312. The baseline sequence number field 315 stores a base line sequence number for the token issuing authority.

A baseline sequence number is a sequence number generated by the token issuing authority at a defined baseline time. The particular baseline time is indicated by the time field 316. The rate field 317 determines a rate of change for the baseline sequence number. The rate field specifies the rate, in various embodiments, as increments (or decrements) to the baseline sequence number per second, millisecond, or other predetermined time period. The rate field 317 stores a value that is, in some embodiments, used in conjunction with the baseline sequence number field 315 and the baseline time field 316 to extrapolate or predict a sequence number or sequence number range for tokens generated by the issuing authority (identified via 312) at an additional second time. The online flag field 318 indicates whether the issuing authority has been detected as being online or offline.

The client tracking table 321 includes a client identifier 322, token validation result 324, time field 326, and issuing authority field 328. The client identifier field 322 uniquely identifies a particular client. In this context, a client is an entity that seeks access to computer resources via a token. For example, the service 104 and/or service 204 are identified as a client in the client table 321 in at least some embodiments. The validation result field 324 stores a result of a token validation provided by the client. Thus, if a valid token is provided, the validity is stored in the validation result field, whereas if an invalid token is provided by the client, that invalidity is also recorded in the validation result field.

The time field 326 stores a time when the validation result was recorded. The time field 326 is used in some embodiments to provide for a moving average of validation results for a particular client. Older results may be discounted relative to newer results, or may be eliminated from the determination of client reputation entirety and deleted from the client tracking table 321 entirely after reaching a threshold age.

The issuing authority field 328 stores an issuing authority of a token that provided the token validation result stored in field 324. Storing the issuing authority field 328 in the client tracking table allows the client tracking table to perform an additional function, that of tracking validation results for a particular token issuing authority. For example, determinations of a percentage of token validations of tokens from a particular token issuing authority, within a threshold period of time are determined in some aspects to determine whether a token issuing authority is in good standing or not. As explained further below, if a percentage of token validations for tokens issued by the particular token issuing authority is above a threshold (or meets a criterion), the token issuing authority is considered to be in good standing, otherwise they are considered to not be in good standing.

A separate row in the table 321 is provided for each token validation result. The client table 321 is used in some of the disclosed embodiments to establish a reputation for a particular client. A client with a track record of providing valid tokens may be more trustworthy than an unknown client or one with a history of presenting invalid tokens.

Figure 4:
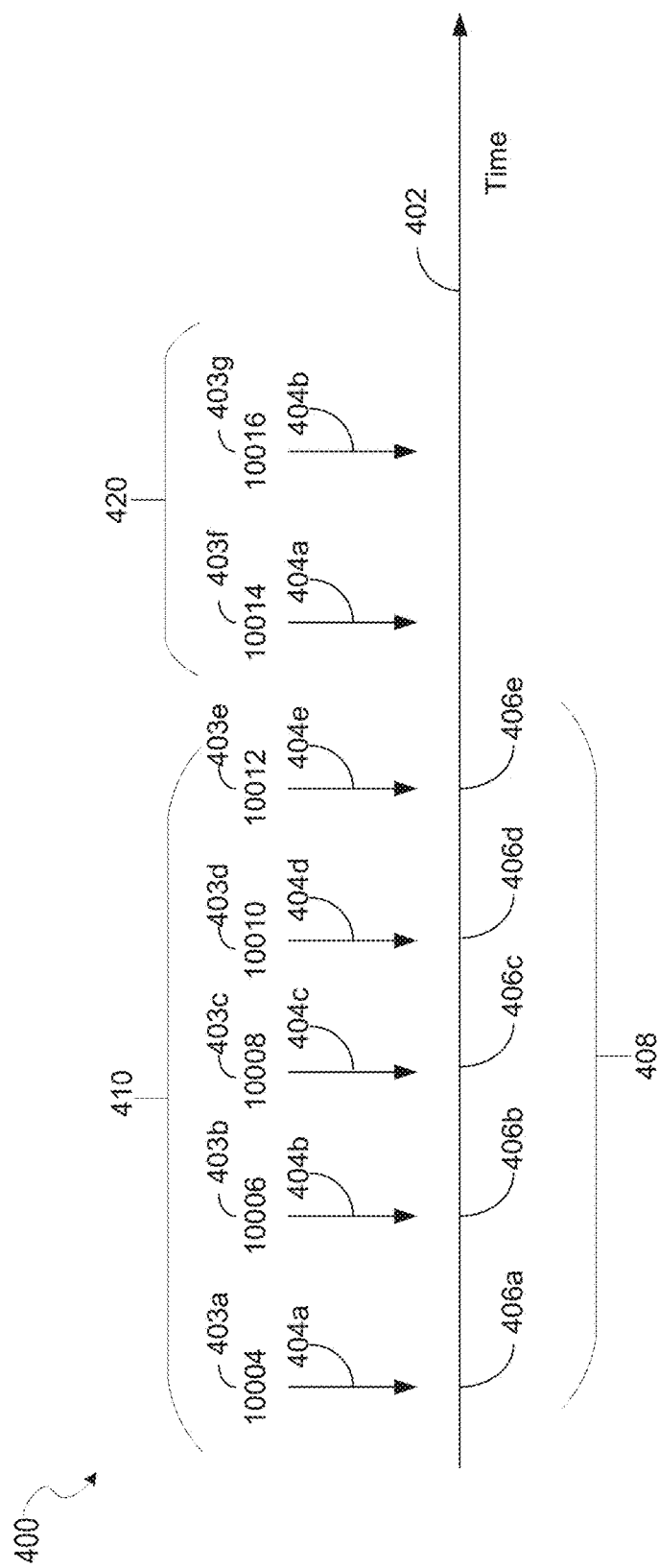
FIG. 4 illustrates a method of predicting token sequence numbers that is implemented in at least some of the disclosed embodiments.

FIG. 4 illustrates a method of predicting token sequence numbers that is implemented in at least some of the disclosed embodiments. FIG. 4 shows a series of tokens being issued sequentially in time. Time is shown via horizontal axis 402. Each of the tokens has a sequence number 403a-e. The sequence numbers 403a-e are shown increasing by two (2) with each issuance, although in some embodiments, how sequence numbers change sequentially may vary. For example, sequence numbers may increment by more or less than the illustrated two (2) units. In some embodiments, sequence numbers may decrease over time. Issuance of the series of tokens is represented by a series of vertical arrows 404a-e. The vertical arrows represent notifications in some embodiments. Some of the disclosed embodiments store information indicating a time at which each of the tokens is issued, shown as times 406a-e.

Some of the disclosed embodiments determine an elapsed time 408 for a series of token issuances, as represented by 404a-e. These embodiments also note a difference 410 in token sequence numbers 403a-e that occur during the elapsed time 408. From this information, these embodiments determine a rate at which the sequence numbers 403a-e are changing. This rate information is used, in some embodiments, to predict sequence numbers generated by the token issuing authority. A baseline sequence number (e.g. 403e) is selected in some embodiments, from which additional sequence numbers and their respective issuance time are predicted. FIG. 4 shows predicted sequence numbers 420, including sequence numbers 403f and 403g, based on the determined rate information (e.g. stored in rate field 317) and baseline sequence number (e.g. stored in field 315) information.

Figure 5:
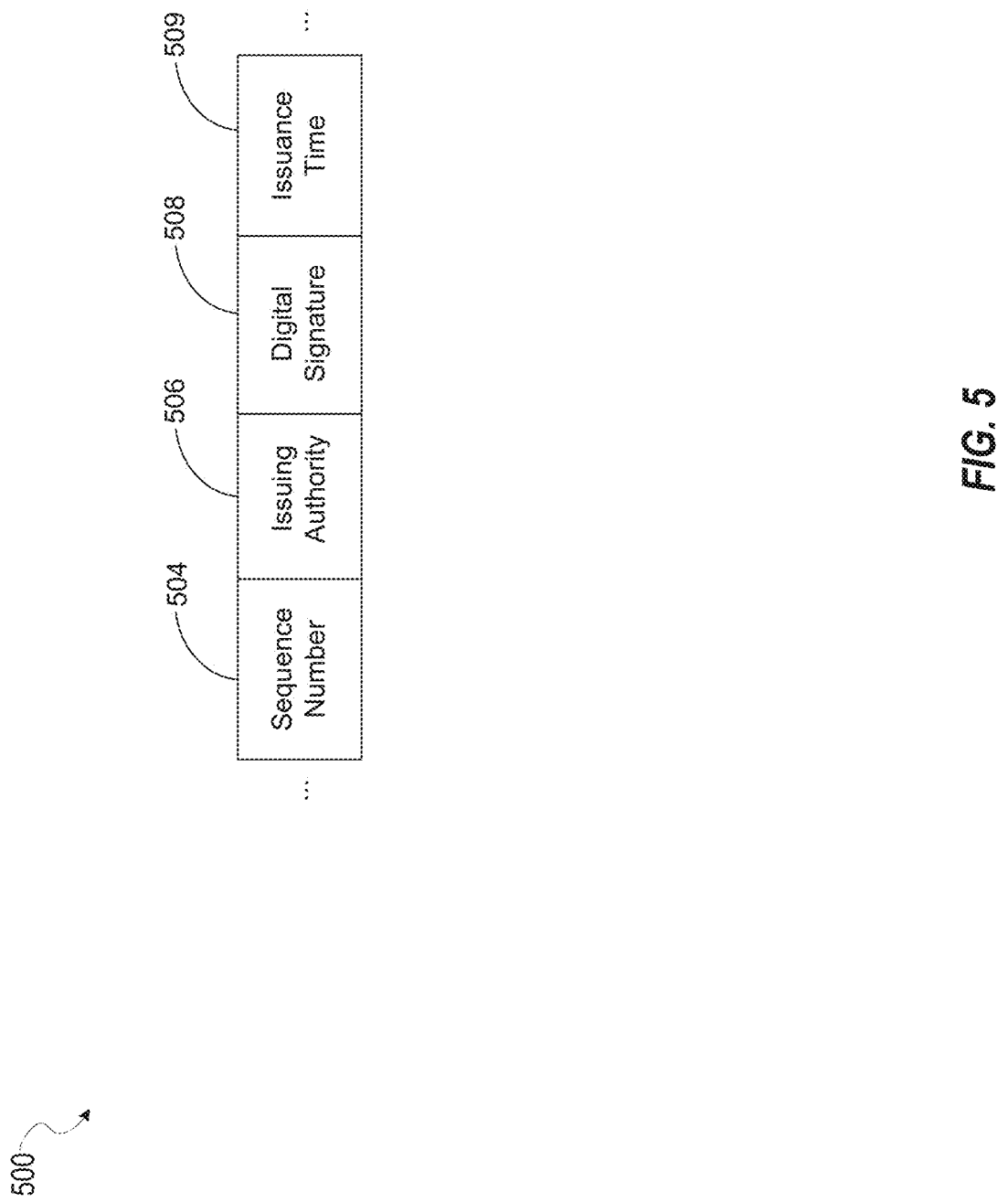
FIG. 5 is an example portion of a token and/or notification and/or message that may be implemented in one or more of the disclosed embodiments.

FIG. 5 is an example portion of a token and/or notification and/or message that may be implemented in one or more of the disclosed embodiments. In some embodiments, one or more of the notification 107 and/or the message 220a may include one or more of the fields discussed below with respect to the portion 500 and FIG. 5.

The portion 500 includes a sequence number field 504, issuing authority field 506, digital signature field 508 and issuance time field 509. The sequence number field 504 stores a sequence number for a token. As discussed above, token issuing authorities may, in some embodiments, include a unique sequence number with each token issued by the token issuing authority. The issuing authority is identified via field 506. The digital signature field 508 stores a digital signature. The digital signature is generated based on at least some of the contents of the portion 500 (sans the digital signature itself). The digital signature stored in field 508 is generated, in some embodiments, using a private key of the issuing authority (identified via field 506). The issuance time field 509 stores a value indicating a time that the token was issued.

Figure 6:
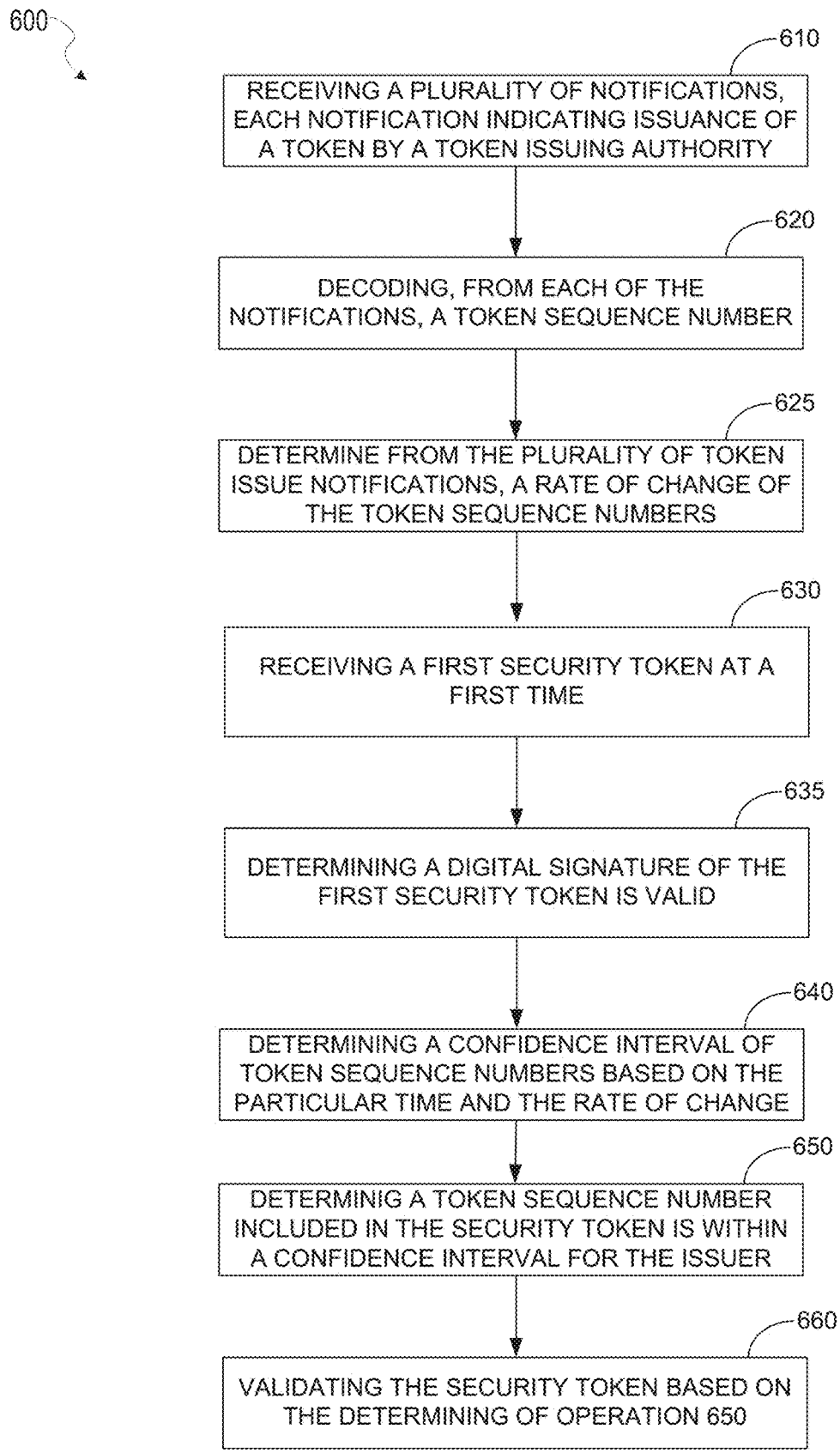
FIG. 6 is a flowchart of a process for validating a token that is implemented in one or more of the disclosed embodiments.

FIG. 6 is a flowchart of a process for validating a token that is implemented in one or more of the disclosed embodiments. One or more of the functions discussed below with respect to FIG. 6 is performed by hardware processing circuitry. For example, in some embodiments, instructions stored in an electronic memory configure the hardware processing circuitry to perform one or more of the functions discussed below with respect to FIG. 6. Note that this specification may label multiple determining, or other operations, as, for example, first determining, second determining, third determining in order to distinguish between the different determining (or other operations). However, this labeling using first, second, third, etc, should not be used to imply a particular order of the labeled operations. Instead, this labeling is simply to ensure clear identification of multiple operations with similar names or descriptions.

In operation 610, a plurality of notifications are received. Each of the notifications indicate issuance of a token by a token issuing authority. For example, as discussed above with respect to FIG. 1, the enterprise server 106 provides notifications 107 to the token forensics server 108. In some other embodiments, the notifications are read from a data store, such as the token datastore 110. Similarly, in FIG. 2, the enterprise server 206 is described as providing a token to the token validation server 208 via a message 220a. The message 220a is considered a notification in at least some of the disclosed embodiments.

In operation 620, a token sequence number is decoded from each of the notifications. For example, as discussed above with respect to the example notification 500, in some embodiments the notification includes a token sequence number field 504 that may provide for decoding the token sequence number from each of the notification(s)/message(s).

In operation 625, a rate of change of the token sequence numbers is determined. In some embodiments, operation 625 determines an elapsed time between issuance of the plurality of tokens. For example, in some embodiments, an issuance time of each token is included in the respective notification for the token (e.g. such as issuance time field 509 of notification 500). Alternatively, the elapsed time is determined based on an elapsed time between reception of the notifications themselves. A difference in sequence numbers of the tokens received in the notifications is also determined. For example, with respect to the example token issuances illustrated in FIG. 4, a difference between token sequence number 403a and 403e is determined in some embodiments, along with the elapsed time 408 between reception of notifications 404a and 404e for the respective token sequence numbers 403a and 403e. A rate of change of the token sequence number is then determined based on the elapsed time of token issuances or notifications and a change in the sequence numbers observed during the elapsed time.

In operation 630, a first security token is received at a first time. For example, as discussed above, the token forensics server 108 or the token validation server 208 receives token information from enterprise server 106 or 206 respectively.

In operation 635, a digital signature of the first security token is validated. For example, in some embodiments, operation 635 determines a token issuing authority of the token via data included in the token itself (e.g. token/notification 500, field 508). From the issuing authority information, a public key of the issuing authority is determined (e.g. via field 314). Data of the token is then decoded based on the public key to ensure the validity of the digital signature.

In operation 640, a confidence interval or range of token sequence numbers is determined based on the first time the first security token was received, and the rate of change. As discussed above, some embodiments store a baseline sequence number and baseline time, from which, along with the determined rate of change, can be used to predict or extrapolate a mean predicted sequence number for a first time. Operation 640 also determines, in some embodiments, a confidence interval of sequence number values around the mean for tokens issued by the token issuing authority. Alternatively, some embodiments determine a likely range of values for token sequence numbers from a particular token issuing authority at a particular point in time. The mean predicted sequence number may be determined based on Equation 1 below:

$$\text{mean sequence number} = BSN + (\text{rate} * \text{issue time} - \text{baseline time}), \quad (1)$$

where:
mean sequence number is the predicted sequence number at the issue time.

BSN is the baseline sequence number that can be used in conjunction with the rate to predict sequence numbers (e.g. field 315), issue time is the issue time of the token (e.g. (alternatively a current time or reception time of the token can be used), baseline time is the baseline time used in conjunction with the rate and BSN to predict sequence number (e.g. field 316).

In operation 650, a determination is made as to whether a sequence number of the first security token is within the confidence interval or range for the issuer of the first security token. In some embodiments, operation 650 determines the sequence number is within a predetermined threshold confidence interval of a mean of a predicted sequence number at the issue time of the token (or the current time). Various thresholds may be used including 80%, 85%, 90%, 95%, 96%, 97%, 98%, 99% or any confidence interval.

In operation 660, the security token is validated (or invalidated) based on whether the sequence number of the first security token is within a predetermined confidence interval and/or a determined range as discussed above.

Figure 7:
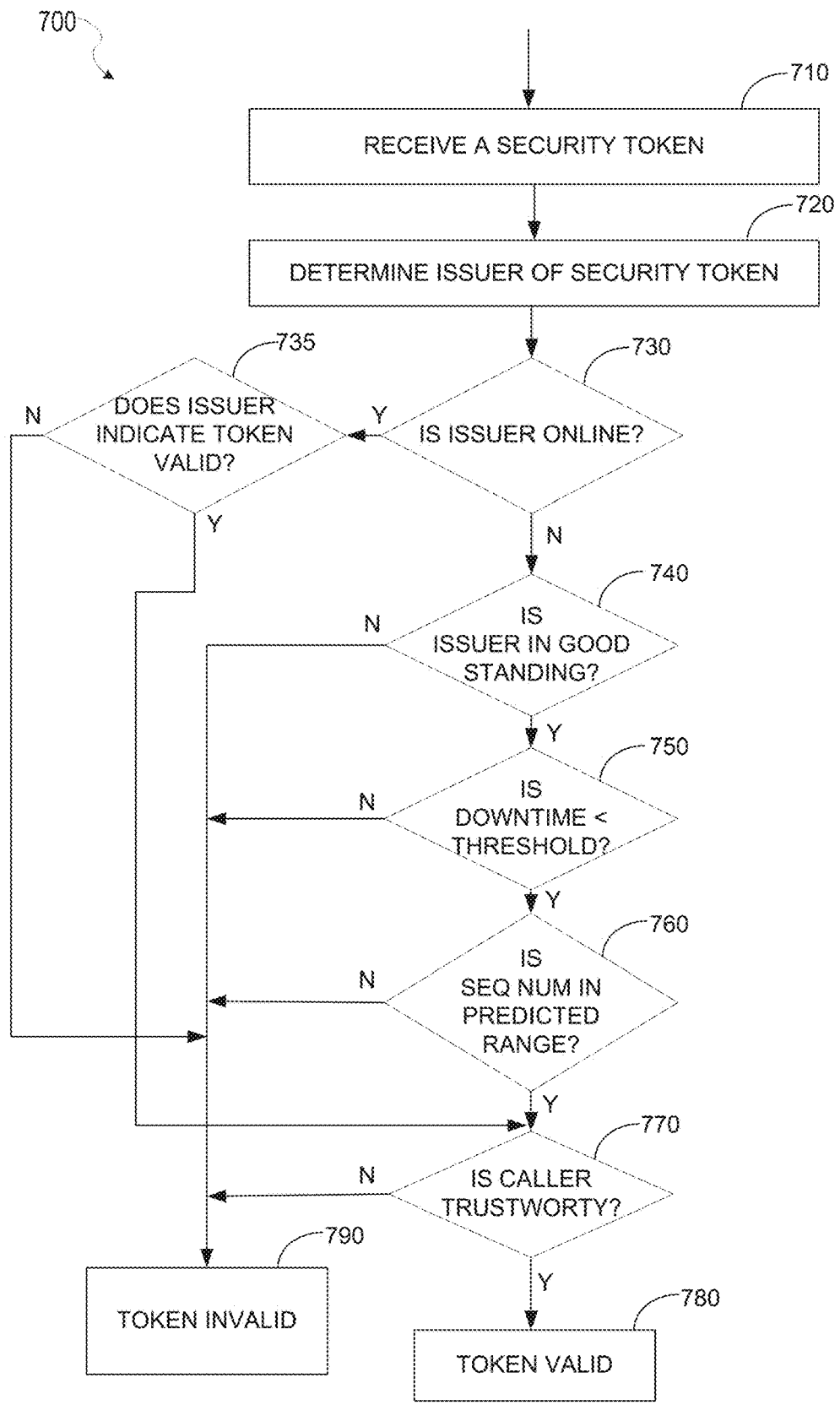
FIG. 7 is a flowchart of a process for validating a token that is implemented in one or more of the disclosed embodiments.

FIG. 7 is a flowchart of a process for validating a token that is implemented in one or more of the disclosed embodiments. One or more of the functions discussed below with respect to FIG. 7 is performed by hardware processing circuitry. For example, in some embodiments, instructions stored in an electronic memory configure the hardware processing circuitry to perform one or more of the functions discussed below with respect to FIG. 7.

In operation 710, a security token is received. For example, as discussed above with respect to each of FIGS. 1 and 2, the token forensics server 108 and the token validation server 208 respectively receive token information from enterprise servers 106 and 206.

In operation 720, an issuer of the token is determined. For example, as discussed above with respect to FIG. 5, a notification or token includes an identifier of an issuer of the token in at least some embodiments. The field 506 facilitates the determination of operation 720 in at least some embodiments. Decision operation 730 determines whether the issuer is online. For example, some embodiment monitor connectivity with a token issuer, such as a token issuer running on the token issuing server 102 and/or 202. If the monitoring detects that the token issuer is unresponsive, then decision block 730 determines the issuer is not online. Otherwise, the token issuer is determined to be online, in which case process 700 moves to decision block 735.

Decision block 735 determines whether the issuer indicates the token is valid. For example, in some embodiments, a token issuer provides an API that provides for validation of tokens provided by the issuer. Thus, in some embodiments, decision operation 735 sends a message or otherwise invokes such an API provided by the token issuing authority to determine validity of the token. If the token is not valid, process 700 moves from decision block 735 to operation 790, discussed below. If the issuer indicates the token is valid, process 700 moves from decision operation 735 to decision operation 770, discussed below.

If the issuer is not online, process 700 moves from decision operation 730 to decision operation 740, which determines whether the issuer is in good standing. Whether the issuer is in good standing or not may relate to whether tokens issued by the issuer are generally determined to be valid. For example, as discussed above with respect to FIG. 3, the client table tracks results of token validations and may include, in some embodiments, an identification of an issuer of each token subject to validation (e.g. via field 328). If the number or percentage of token issued by an issuer are determined to meet a predefined criterion (e.g. above a predetermined good standing threshold), then, in some embodiments, the issuer is considered to be in good standing. If the predefined criterion is not met, the issuer is considered to not be in good standing in at least some embodiments. If the issuer is not in good standing, process 700 moves from decision operation 740 to operation 790, discussed below. Otherwise, process 700 moves from decision operation 740 to decision operation 750 which determines how long the issuer has been down (offline).

As discussed above, some embodiments monitor connectivity to a token issuing authority and track when/if a token issuing authority is available and/or unavailable. If the issuer has been down for longer than a predetermined downtime threshold, process 700 moves from decision operation 750 to operation 790, discussed below. Otherwise, process 700 moves from decision operation 750 to decision operation 760.

Decision operation 760 determines whether a sequence number of the token is within a range or confidence interval. For example, as discussed above with respect to FIG. 6, a confidence interval is determined, in some embodiments, for a token issuer based on a previous history of token issuances (e.g. as discussed above with respect to FIG. 4). In some embodiments, decision operation 760 implements one or more of the functions discussed above with respect to FIG. 6.

If the sequence number of the token falls outside the confidence interval or predetermined range for the issuer, process 700 moves from decision operation 760 to operation 790, discussed below. If the sequence number of the tokens falls within the confidence interval, process 700 moves from decision operation 760 to decision operation 770, which determines whether a caller is trustworthy.

As discussed above with respect to FIG. 3, some embodiments determine a percentage of caller token validation affects that succeed and/or fail. If the percentage meets a criterion or otherwise is above a trust threshold, some embodiments conclude that the caller (e.g. service 104 and/or service 204). In some embodiments, the percentage is determined based on a number of validation events that occur within a moving elapsed time (e.g. in the last one, two, three, four, or five minutes). If the caller is not determined to be trustworthy, process 700 moves from decision operation 770 to operation 990, otherwise, process 700 moves from decision operation 770 to 780.

Operation 780 determines the token is valid while operation 790 determines the token is invalid. In some embodiments, invalid tokens are added to an inspection queue (e.g. 130 or 230). If the token is confirmed to be invalid, some embodiments cause a reset and/or regeneration of a private/public key pair for the token issuing authority. In other words, if the digital signature of a token is valid, but the token itself is invalid (e.g. as determined by one or more of the decision operations 735, 740, 750, or 760), it may indicate the private key of the token issuing authority has been compromised, and a fraudulent or otherwise nefarious actor is generating fraudulent tokens.

Figure 8:
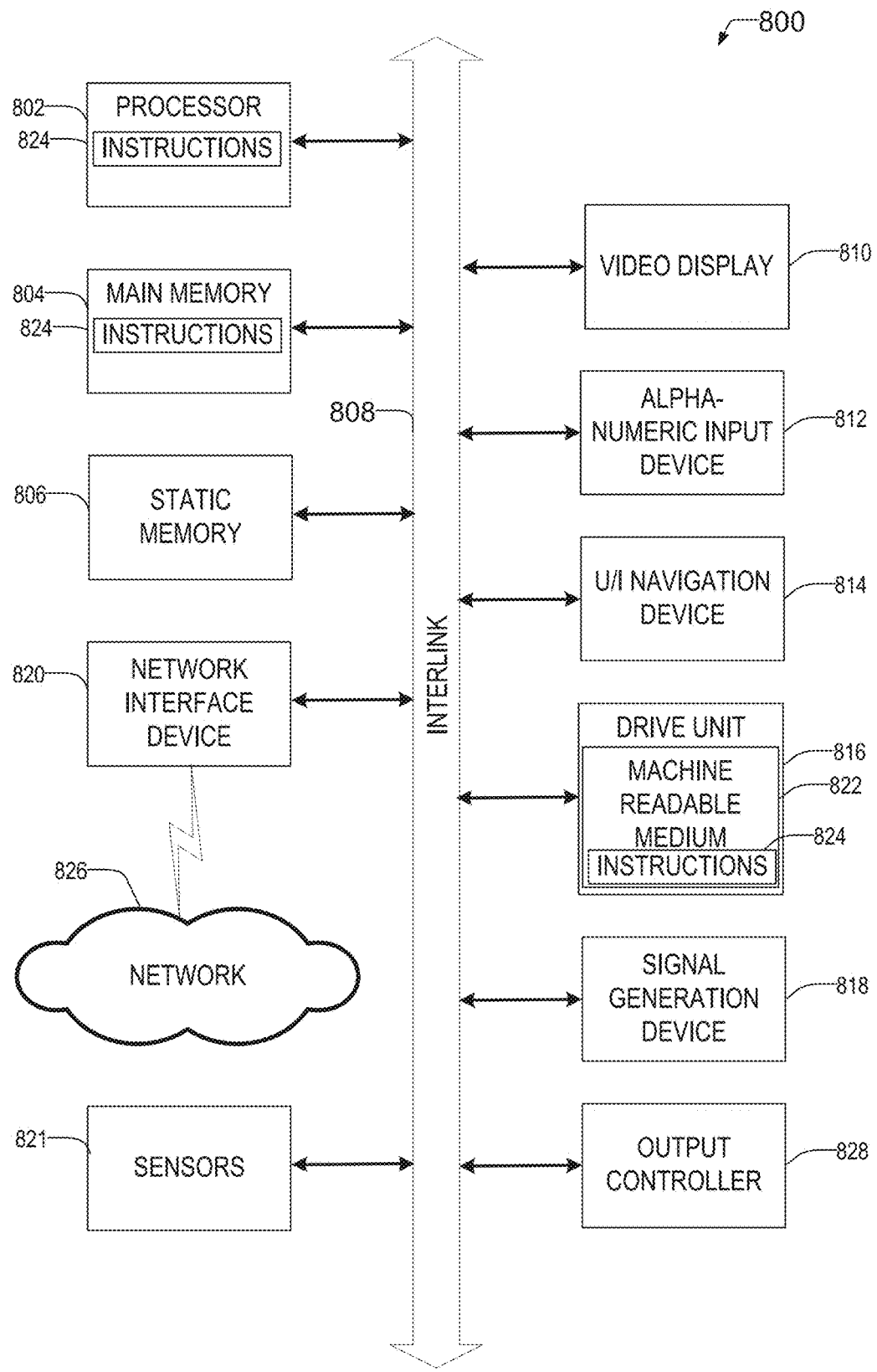
FIG. 8 illustrates a block diagram of an example machine that is implemented in one or more of the disclosed embodiments.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 800 may perform one or more of the processes described above with respect to FIGS. 1-7 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method performed by hardware processing circuitry, comprising: receiving a plurality of notifications, each notification indicating issuance of a security token, wherein an issuer of each security token is a first token issuing authority; decoding, from the plurality of notifications, a corresponding plurality of token sequence numbers; first determining, from the plurality of notifications, a rate of change of the plurality of token sequence numbers; receiving a first security token at a first time; second determining an issuer of the first security token is the first token issuing authority; third determining a digital signature of the first security token is valid; fourth determining, based on the first time and the rate of change, a token sequence number confidence interval of the first security token issuing authority; fifth determining a token sequence number included in the first security token is within the token sequence number confidence interval; and validating the first security token based on the fifth determining.

In Example 2, the subject matter of Example 1 optionally includes sixth determining a second security token issuing authority is offline during a time period; receiving a second security token during the time period; seventh determining an issuer of the second security token is the second security token issuing authority; and validating the second security token based on the sixth and seventh determining.

In Example 3, the subject matter of any one or more of Examples 1-2 optionally include receiving a third security token from a first service; sixth determining a validation rate of tokens received from the first service meets a criterion; and validating the third security token based on the sixth determining.

In Example 4, the subject matter of Example 3 optionally includes wherein the first security token is received from a second service, the method further comprising: storing an indication of an association between the validation of the first security token and the second service; determining, based on the stored indication, a validation rate of tokens received from the second service; and validating a fourth security token based on the validation rate.

In Example 5, the subject matter of any one or more of Examples 1-4 optionally include receiving a second security token at a second time; validating a second digital signature of the second security token; sixth determining a second token sequence number of the second security token; seventh determining, based on the second time and the rate of change, a second range of token sequence numbers; eighth determining the second token sequence number is outside the determined second range; and generating, based on the eighth determining, a notification indicating the first security token issuing authority's private key is compromised.

In Example 6, the subject matter of Example 5 optionally includes receiving a third security token from a service; ninth determining a validation rate of tokens received from the service meets a criterion; tenth determining an issuer of the third security token is a second security token issuing authority; and generating, based on the tenth determining, a notification indicating the second security token issuing authority's private key is comprised.

In Example 7, the subject matter of any one or more of Examples 1-6 optionally include monitoring connectivity with the first security token issuing authority; and determining, based on the monitoring, the first security token issuing authority is not online, wherein the fourth determining of the token sequence number confidence interval is in response to the determination that the first security token issuing authority is not online.

In Example 8, the subject matter of Example 7 optionally includes determining a percentage of valid tokens indicating an issuer of the respective valid token is the first security token issuing authority, wherein the fourth determining of the token sequence number confidence interval is in response to the percentage meeting a criterion.

Example 9 is a system, comprising: hardware processing circuitry; one or more hardware memories comprising instructions that when executed configure the hardware processing circuitry to perform operations comprising: receiving a plurality of notifications, each notification indicating issuance of a token, wherein an issuer of each security token is a first first security token issuing authority; decoding, from the plurality of notifications, a corresponding plurality of token sequence numbers; first determining, from the plurality of notifications, a rate of change of the plurality of token sequence numbers; receiving a first security token at a first time; second determining an issuer of the first security token is the first security token issuing authority; third determining a digital signature of the first security token is valid; fourth determining, based on the first time and the rate of change, a token sequence number confidence interval of the first security token issuing authority; fifth determining a token sequence number included in the first security token is within the token sequence number confidence interval; and validating the first security token based on the fifth determining.

In Example 10, the subject matter of Example 9 optionally includes the operations further comprising: sixth determining a second security token issuing authority is offline during a time period; receiving a second security token during the time period: seventh determining an issuer of the second security token is the second security token issuing authority; and validating the second security token based on the sixth and seventh determining.

In Example 11, the subject matter of any one or more of Examples 9-10 optionally include the operations further comprising: receiving a third security token from a first service; sixth determining a validation rate of tokens received from the first service meets a criterion; and validating the third security token based on the sixth determining.

In Example 12, the subject matter of Example 11 optionally includes wherein the first security token is received from a second service, the operations further comprising: storing an indication of an association between the validation of the first security token and the second service; determining, based on the stored indication, a validation rate of tokens received from the second service; and validating a fourth security token based on the validation rate.

In Example 13, the subject matter of any one or more of Examples 9-12 optionally include the operations further comprising: receiving a second security token at a second time; validating a second digital signature of the second security token; fifth determining a second token sequence number of the second security token: sixth determining, based on the second time and the rate of change, a second range of token sequence numbers; seventh determining the second token sequence number is outside the determined second range; and generating, based on the seventh determining, a notification indicating the first security token issuing authority's private key is compromised.

In Example 14, the subject matter of Example 13 optionally includes the operations further comprising: receiving a third security token from a service; eighth determining a validation rate of tokens received from the service meets a criterion; ninth determining an issuer of the third security token is a second token issuing authority; and generating, based on the eighth determining, a notification indicating the second token issuing authority's private key is comprised.

In Example 15, the subject matter of any one or more of Examples 9-14 optionally include the operations further comprising monitoring connectivity with the first security token issuing authority; and determining, based on the monitoring, the first security token issuing authority is not online, wherein the fourth determining of the token sequence number confidence interval is in response to the determination that the first security token issuing authority is not online.

In Example 16, the subject matter of Example 15 optionally includes the operations further comprising determining a percentage of valid tokens indicating an issuer of the respective valid token is the first security token issuing authority, wherein the fourth determining of the token sequence number confidence interval is in response to the percentage meeting a criterion.

Example 17 is a non-transitory computer readable storage medium comprising instructions that when executed configure hardware processing circuitry to perform operations comprising: receiving a plurality of notifications, each notification indicating issuance of a token, wherein an issuer of each security token is a first security token issuing authority; decoding, from the plurality of notifications, a corresponding plurality of token sequence numbers; first determining, from the plurality of notifications, a rate of change of the plurality of token sequence numbers; receiving a first security token at a first time; second determining the first security token is issued by the first security token issuing authority; third determining a digital signature of the first security token is valid; fourth determining, based on the first time and the rate of change, a token sequence number confidence interval of the first security token issuing authority; fifth determining a token sequence number included in the first security token is within the token sequence number confidence interval: and validating the first security token based on the fifth determining.

In Example 18, the subject matter of Example 17 optionally includes sixth determining a second security token issuing authority is offline during a time period; receiving a second security token during the time period; seventh determining an issuer of the second security token is the second security token issuing authority; and validating the second security token based on the sixth and seventh determining.

In Example 19, the subject matter of any one or more of Examples 17-18 optionally include receiving a third security token from a first service; sixth determining a validation rate of tokens received from the first service meets a criterion; and validating the third security token based on the sixth determining.

In Example 20, the subject matter of Example 19 optionally includes wherein the first security token is received from a second service, the operations further comprising: storing an indication of an association between the validation of the first security token and the second service; determining, based on the stored indication, a validation rate of tokens received from the second service: and validating a fourth security token based on the validation rate. Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A method performed by hardware processing circuitry, the method comprising:
    determining, from a plurality of notifications, a rate of change of a plurality of token sequence numbers, the rate of change indicating a number of increments or decrements of a baseline sequence number that occur per unit time, the increments or decrements increase or decrease the baseline sequence number by a determinable amount;
    receiving a first security token at a first time, the first security token including a token sequence number;
    responsive to determining an issuer of the first security token is offline, determining, based on the first time and the rate of change, a token sequence number confidence interval of the issuer; and
    validating, based on determining the token sequence number included in the first security token is within the token sequence number confidence interval, the first security token.

2. The method of claim 1, further comprising:
  determining a second issuer is offline during a first time period;
  receiving a second security token during a second time period;
  determining a provider of the second security token is the second issuer; and
  validating the second security token.

3. The method of claim 1, further comprising:
  receiving a third security token from a first service;
  determining a validation rate of tokens received from the first service meets a criterion; and
  validating the third security token based on the determining the validation rate of tokens received from the first service meets the criterion.

4. The method of claim 3, wherein the first security token is received from a second service, the method further comprising:
  storing an indication of an association between the validation of the first security token and the second service;
  determining, based on the stored indication, a validation rate of tokens received from the second service; and
  validating a fourth security token based on the validation rate of tokens received from the second service.

5. The method of claim 1, further comprising:
  receiving a second security token at a second time;
  validating a second digital signature of the second security token;
  determining a second token sequence number of the second security token;
  determining, based on the second time and the rate of change, a second range of token sequence numbers;
  determining the second token sequence number is outside the determined second range; and
  generating, based on the determining the second token sequence number is outside the determined second range, a notification indicating a private key of the issuer is compromised.

6. The method of claim 5, further comprising:
  receiving a third security token from a service;
  determining a validation rate of tokens received from the service meets a criterion; and
  generating, based on determining a provider of the third security token is a second issuer, a notification indicating a private key of the second issuer is compromised.

7. The method of claim 1, further comprising:
  receiving the plurality of notifications, each notification indicating issuance of a security token, wherein a provider of each security token is the issuer; and
  decoding, from the plurality of notifications, the plurality of token sequence numbers.

8. The method of claim 1, further comprising determining a percentage of valid tokens indicating a provider of the respective valid tokens is the issuer of the first security token, wherein the determining of the token sequence number confidence interval is in response to the percentage meeting a criterion.

9. A system, comprising:
  hardware processing circuitry;
  one or more hardware memories comprising instructions that when executed configure the hardware processing circuitry to perform operations comprising:
    determining, from a plurality of notifications, a rate of change of a plurality of token sequence numbers, the rate of change indicating a number of increments or decrements of a baseline sequence number that occur per unit time, the increments or decrements increase or decrease the baseline sequence number by a determinable amount;
    receiving a first security token at a first time from an issuer, the first security token including a token sequence number;
    responsive to determining the issuer is offline, determining, based on the first time and the rate of change, a token sequence number confidence interval of the issuer; and
    validating, based on determining the token sequence number included in the first security token is within the token sequence number confidence interval, the first security token.

10. The system of claim 9, the operations further comprising:
  determining a second issuer is offline during a first period of time;
  receiving a second security token during a second time period;
  determining an issuer of the second security token is the second issuer; and
  validating the second security token.

11. The system of claim 9, the operations further comprising:
  receiving a third security token from a first service;
  determining a validation rate of tokens received from the first service meets a criterion; and
  validating the third security token based on the determining the validation rate of tokens received from the first service meets the criterion.

12. The system of claim 11, wherein the first security token is received from a second service, the operations further comprising:
  storing an indication of an association between the validation of the first security token and the second service;
  determining, based on the stored indication, a validation rate of tokens received from the second service; and
  validating a fourth security token based on the validation rate of tokens received from the second service.

13. The system of claim 9, the operations further comprising:
  receiving a second security token at a second time;
  validating a second digital signature of the second security token;
  determining a second token sequence number of the second security token;
  determining, based on the second time and the rate of change, a second range of token sequence numbers;
  determining the second token sequence number is outside the determined second range; and
  generating, based on the determining the second token sequence number is outside the determined second range, a notification indicating a private key of the issuer is compromised.

14. The system of claim 13, the operations further comprising:
  receiving a third security token from a service;
  determining a validation rate of tokens received from the service meets a criterion; and
  generating, based on determining a provider of the third security token is a second issuer, a notification indicating a private key of the second issuer is compromised.

15. The system of claim 9, wherein the operations further comprise:

receiving the plurality of notifications, each notification indicating issuance of a security token, wherein a provider of each security token is the issuer; and decoding, from the plurality of notifications, the plurality of token sequence numbers.

16. The system of claim 9, the operations further comprising determining a percentage of valid tokens indicating a provider of the respective valid tokens is the issuer, wherein the determining of the token sequence number confidence interval is in response to the percentage meeting a criterion.

17. A non-transitory computer readable storage medium comprising instructions that when executed configure hardware processing circuitry to perform operations comprising:

determining, from a plurality of notifications, a rate of change of a plurality of token sequence numbers, the rate of change indicating a number of increments or decrements of a baseline sequence number that occur per unit time, the increments or decrements increase or decrease the baseline sequence number by a determinable amount;

receiving a first security token at a first time from an issuer, the first security token including a token sequence number;

responsive to determining the issuer is offline, determining, based on the first time and the rate of change, a token sequence number confidence interval of the first security token issuing authority; and validating, based on determining the token sequence number included in the first security token is within the token sequence number confidence interval, the first security token.

18. The non-transitory computer readable storage medium of claim 17, further comprising:

determining a second issuer is offline during a first time period;

receiving a second security token during a second time period;

determining a provider of the second security token is the second issuer; and validating the second security token.

19. The non-transitory computer readable storage medium of claim 17, further comprising:

receiving a third security token from a first service;

determining a validation rate of tokens received from the first service meets a criterion; and validating the third security token based on the determining the validation rate of tokens received from the first service meets a criterion.

20. The non-transitory computer readable storage medium of claim 19, wherein the first security token is received from a second service, the operations further comprising:

storing an indication of an association between the validation of the first security token and the second service;

determining, based on the stored indication, a validation rate of tokens received from the second service; and validating a fourth security token based on the validation rate of tokens received from the second service.

\* \* \* \* \*